United States Patent
Zhao et al.

(10) Patent No.: US 8,552,680 B2
(45) Date of Patent: Oct. 8, 2013

(54) POWER MANAGEMENT CIRCUIT AND ELECTRONIC DEVICE USING THE SAME

(75) Inventors: Xin Zhao, Shenzhen (CN); Hua-Dong Cheng, Shenzhen (CN); Ruey-Shyang You, Taipei Hsien (TW); Han-Che Wang, Taipei Hsien (TW); Xiao-Guang Li, Shenzhen (CN); Kuan-Hong Hsieh, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 266 days.

(21) Appl. No.: 12/873,232

(22) Filed: Aug. 31, 2010

(65) Prior Publication Data

US 2011/0187311 A1 Aug. 4, 2011

(30) Foreign Application Priority Data

Jan. 29, 2010 (CN) .......................... 2010 1 0300928

(51) Int. Cl.
*H02J 7/00* (2006.01)
(52) U.S. Cl.
USPC ........... 320/101; 320/134; 320/135; 307/408; 323/231
(58) Field of Classification Search
USPC ........................................ 320/101
See application file for complete search history.

(56) References Cited

U.S. PATENT DOCUMENTS

| 4,314,198 | A | * | 2/1982 | Rogers ........................... 323/351 |
| 5,086,267 | A | * | 2/1992 | Janda et al. .................... 323/350 |
| 5,164,653 | A | * | 11/1992 | Reem ............................. 320/135 |
| 5,569,998 | A | * | 10/1996 | Cowan ............................ 307/66 |
| 7,545,117 | B2 | * | 6/2009 | Kular et al. .................... 320/103 |
| 2005/0258805 | A1 | * | 11/2005 | Thomas et al. ................ 320/134 |
| 2006/0197382 | A1 | * | 9/2006 | Chou et al. ...................... 307/48 |
| 2008/0084177 | A1 | * | 4/2008 | Sander et al. .................. 320/101 |
| 2008/0094025 | A1 | * | 4/2008 | Rosenblatt et al. ........... 320/101 |
| 2009/0179611 | A1 | * | 7/2009 | Sander et al. .................. 320/101 |

FOREIGN PATENT DOCUMENTS

| CN | 2603482 Y | 2/2004 |
| CN | 1949624 A | 4/2007 |
| CN | 1332286 C | 8/2007 |
| CN | 101174773 A | 5/2008 |
| TW | 201008078 A | 2/2010 |
| TW | M324920 | 3/2013 |

* cited by examiner

*Primary Examiner* — Yalkew Fantu
(74) *Attorney, Agent, or Firm* — Altis Law Group, Inc.

(57) ABSTRACT

An electronic device includes a first rechargeable battery, a solar cell mounted on the electronic device, a second rechargeable battery and a power management circuit. The power management circuit includes a control module, a DC/DC module, a switch and a power supply switching module. The DC/DC module is configured for converting the DC power generated by the solar cell from one voltage level to another, and activating and maintaining the activation of the control module. The switch is turned on by the control module when the control module is activated, causing the DC power from the DC/DC module to charge the second rechargeable battery. The power supply switching module is controlled by the control module to select the second rechargeable battery to power the electronic device if the voltage level of the rechargeable battery is lower than that of the second rechargeable battery.

4 Claims, 1 Drawing Sheet

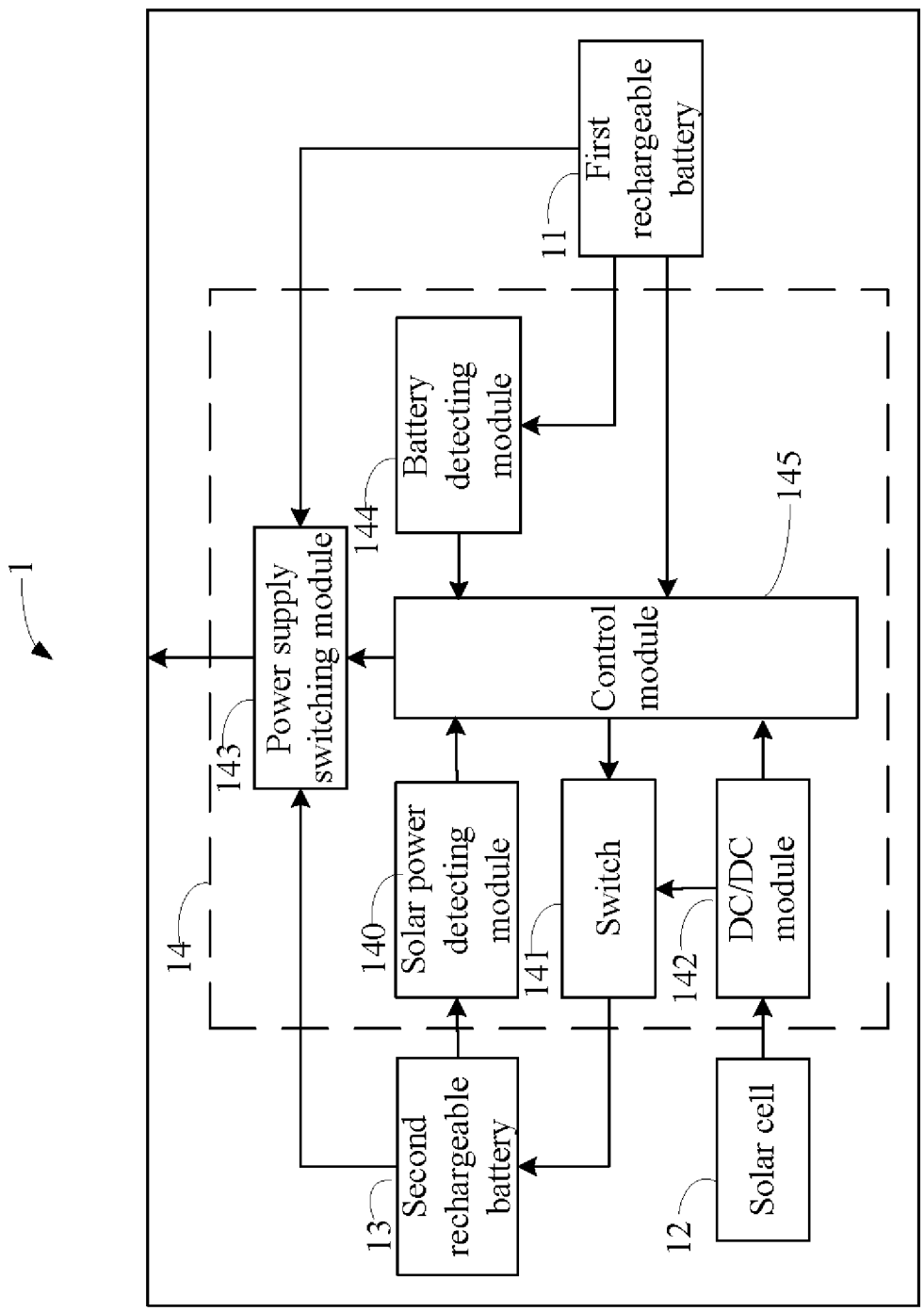

POWER MANAGEMENT CIRCUIT AND ELECTRONIC DEVICE USING THE SAME

BACKGROUND

1. Technical Field

The present disclosure relates to electronic devices and power management circuits and, particularly, to an electronic device having a power management circuit.

2. Description of the Related Art

Some portable electronic devices have been equipped with both rechargeable batteries and solar cells. When the rechargeable battery of a portable electronic device runs out of power, the electronic device is automatically turned off. Under this condition, if a user of the electronic device wants a second rechargeable battery to power the electronic device, the user has to charge the rechargeable battery secondly to power on the electronic device, and then switch to the second rechargeable battery to power the electronic device, which is troublesome.

Therefore, there is room for improvement within the art.

BRIEF DESCRIPTION OF THE DRAWINGS

The components in the drawings are not necessarily drawn to scale, the emphasis instead being placed upon clearly illustrating the principles of a power management circuit and an electronic device using the same. Moreover, in the drawings, like reference numerals designate corresponding parts throughout the several views.

The FIGURE is a block diagram of an electronic device having a power management circuit in accordance with an exemplary embodiment.

DETAILED DESCRIPTION

Referring to the FIGURE, an electronic device 1 includes a first rechargeable battery 11, a solar cell 12, a second rechargeable battery 13, and a power management circuit 14. The solar cell 12 is mounted on a cover (not shown) of the electronic device 1 to receive ambient light beams and transform the received light beams to DC voltage to charge the second rechargeable battery 13. The first rechargeable battery 11 can be charged by alternating current (AC) power (not shown). The first rechargeable battery 11 and the second rechargeable battery 13 are both employed to power the electronic device 1.

The power management circuit 14 includes a power supply switching module 143 and a control module 145. The power supply switching module 143 is connected between the first rechargeable battery 11 and the second rechargeable battery 13, and configured to select the first rechargeable battery 11 or the second rechargeable battery 13 to power the electronic device 1.

The power management circuit 14 further includes a switch 141 and a direct current/direct current (DC/DC) module 142. The DC/DC module 142 is connected between the solar cell 12 and the control module 145, and configured to convert the DC power generated by the solar cell 12 from one voltage level to another. The DC voltage from the DC/DC module 142 is used to activate and maintain the activation of the control module 145. The switch 141 is connected between the second rechargeable battery 13 and the control module 145. When the control module 145 is activated, the control module 145 turns on the switch 141, so that the DC power from the DC/DC module 142 charges the second rechargeable battery 13.

With such configuration, even when the electronic device 1 automatically turns off because it has run out of power, the solar cell 12 receives ambient light beams and generates DC power. The DC/DC module 142 converts the DC power from the solar cell 12 and supplies the power to the control module 145 to activate the control module 145. The control module 145 turns on the switch 141 to charge the second rechargeable battery 13 with the DC power from the DC/DC module 142. The control module 145 further controls the power supply switching module 143 to select the second rechargeable battery 13 to power the electronic device 1. Thus, there is no need for users to manually activate the electronic device 1 using external AC power and then having to select the second rechargeable battery 13 to power the electronic device 1.

The power management circuit 14 further includes a battery detecting module 144 and a solar power detecting module 140. The battery detecting module 144 is configured for detecting the voltage level C1 of the first rechargeable battery 11. The solar power detecting module 140 is configured for detecting voltage level C2 of the second rechargeable battery 14.

The control module 145 is further configured to compare C1 and C2, and controls the power supply switching module 143 to select the first rechargeable battery 11 or the second rechargeable battery 13 to supply power to the electronic device 1 according to the comparison. In this embodiment, if C1 is lower than C2, the power supply switch module 143 selects the second rechargeable battery 13 to supply power to the electronic device 1. If C1 is not lower than C2, the power supply switch module 143 selects the first rechargeable battery 11 to supply power to the electronic device 1.

With such configuration, when the first rechargeable battery 11 runs out of power, the electronic device 1 automatically selects the second rechargeable battery 13 to supply power to the electronic device 1. Therefore, the electronic device 1 will not automatically turn off when the first rechargeable battery 11 is used up, and there is no need for users to manually power on the electronic device 1 using external AC power and then select the second rechargeable battery 13 to power the electronic device 1.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An electronic device, comprising:
a first rechargeable battery;
a solar cell mounted on the electronic device and configured for receiving ambient light beams and transform received light beams into DC voltage;
a second rechargeable battery charged by the solar cell; and
a power management circuit, comprising:
a control module;
a direct current/direct current (DC/DC) module connected between the solar cell and the control module, and configured for converting the DC power generated by the solar cell from one voltage level to another, and activating the control module when the electronic device runs out of power to turn off, and maintaining the activation of the control module when the electronic device is powered by the first rechargeable battery or the second rechargeable battery;
a switch controlled by the control module and connected between the second rechargeable battery and the DC/DC module, wherein the switch is turned on by the control module after the control module is activated, causing the DC power from the DC/DC module to charge the second rechargeable battery; and a power supply switching module controlled by the control module to select the second rechargeable battery to power the electronic device if the voltage level of the first rechargeable battery is lower than that of the second rechargeable battery.

2. The electronic device as recited in claim 1, wherein the power management circuit further comprising:

a battery detecting module, configured for detecting the voltage level of the first rechargeable battery; and a solar power detecting module, configured for detecting the voltage level of the second rechargeable battery;

wherein the control module is further configured for comparing the voltage level of the first rechargeable battery and the voltage level of the second rechargeable battery, and controlling the power supply switching module to select the first rechargeable battery to power the electronic device if the voltage level of the first rechargeable battery is not lower than that of the second rechargeable battery.

3. A power management circuit applied in an electronic device, the electronic device comprising a first rechargeable battery, a solar cell, and a second rechargeable battery, the power management circuit comprising:

a control module;

a direct current/direct current (DC/DC) module connected between the solar cell and the control module, and configured for converting the DC power generated by the solar cell from one voltage level to another, and activating the control module when the electronic device runs out of power to turn off, and maintaining the activation of the control module when the electronic device is powered by the first rechargeable battery or the second rechargeable battery;

a switch controlled by the control module and connected between the second rechargeable battery and the control module, the switch is turned on by the control module when the control module is activated, causing the DC power from the DC/DC module to charge the second rechargeable battery; and a power supply switching module controlled by the control module to select the second rechargeable battery to power the electronic device if the voltage level of the first rechargeable battery is lower than that of the second rechargeable battery.

4. The circuit as recited in claim 3, further comprising:

a battery detecting module, configured for detecting the voltage level of the first rechargeable battery; and a solar power detecting module, configured for detecting the voltage level of the second rechargeable battery;

wherein the control module is further configured for comparing the voltage level of the first rechargeable battery and the voltage level of the second rechargeable battery, and controlling the power supply switching module to select the first rechargeable battery to power the electronic device if the voltage level of the first rechargeable battery is not lower than that of the second rechargeable battery.

* * * * *